C. AMBRETTE.
TRANSMISSION FOR PRESSES.
APPLICATION FILED JAN. 30, 1915.
1,163,304.
Patented Dec. 7, 1915.
3 SHEETS—SHEET 3.
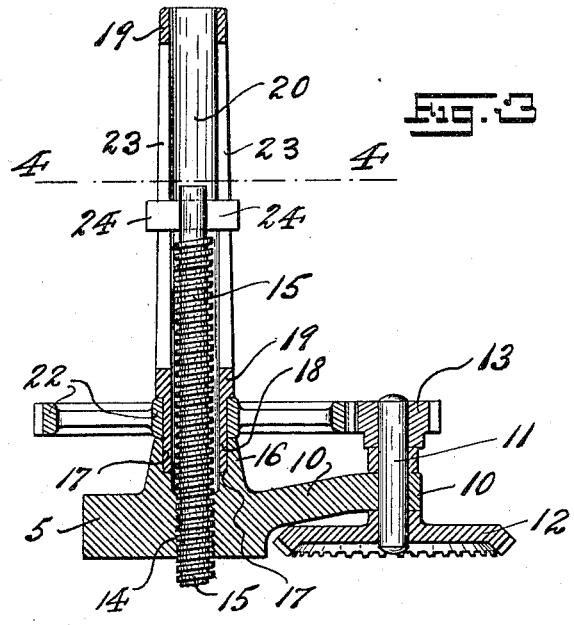
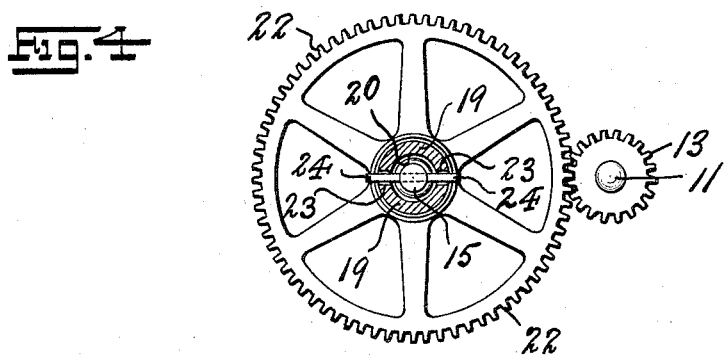

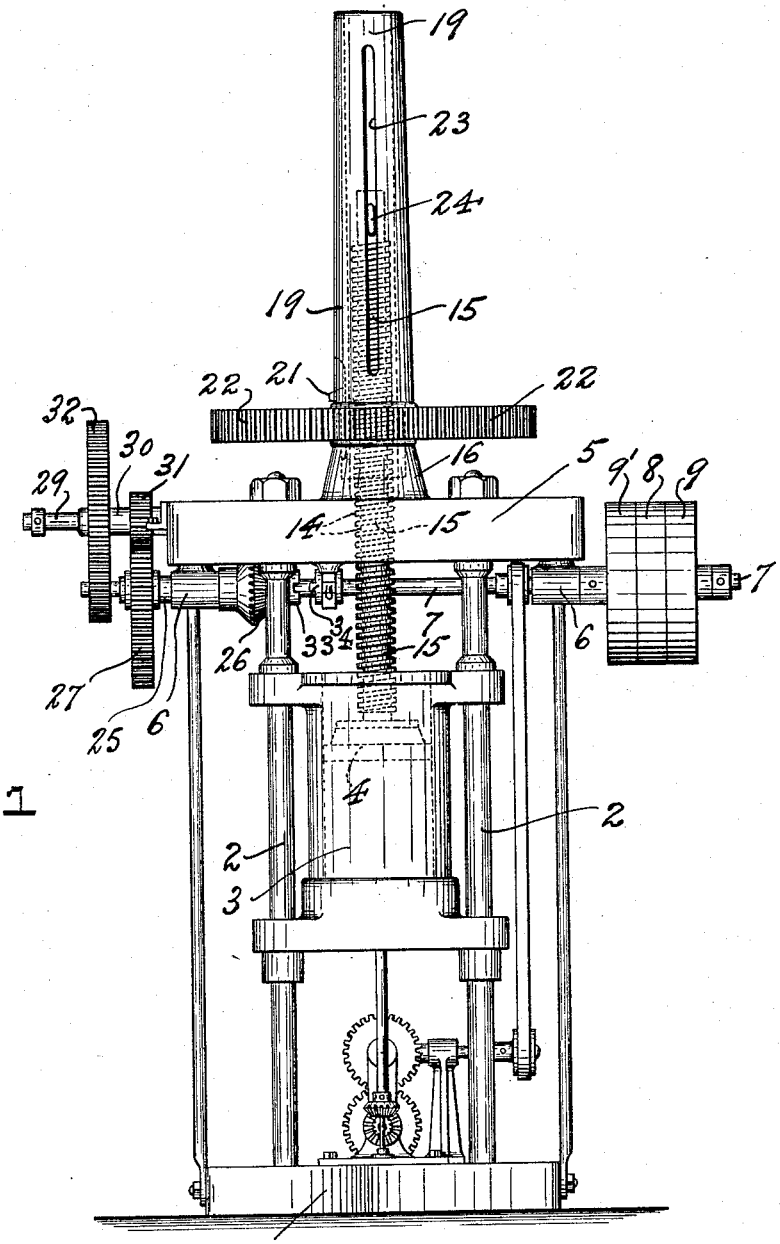

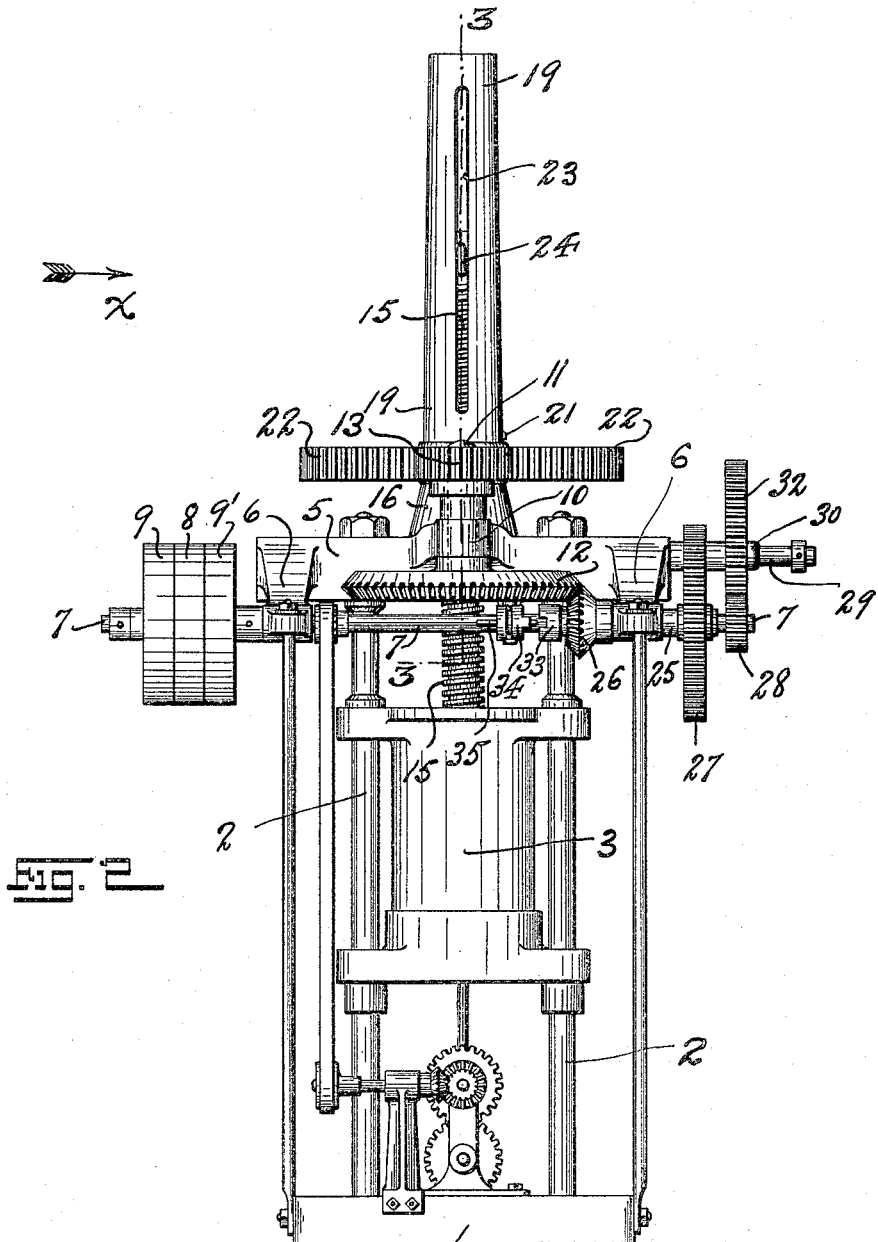

UNITED STATES PATENT OFFICE.

CONRAD AMBRETTE, OF BROOKLYN, NEW YORK, ASSIGNOR TO CEVASCO, CAVAGNARO & AMBRETTE, A FIRM CONSISTING OF JAMES CEVASCO, NICHOLAS J. CAVAGNARO, AND CONRAD AMBRETTE, OF NEW YORK, N. Y.

TRANSMISSION FOR PRESSES.

1,163,304.           Specification of Letters Patent.         Patented Dec. 7, 1915.

Application filed January 30, 1915. Serial No. 5,185.

*To all whom it may concern:*

Be it known that I, CONRAD AMBRETTE, a subject of the King of Italy, residing at Brooklyn, in the county of Kings and State of New York, have invented certain new and useful Improvements in Transmission for Presses; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in presses for making macaroni, spaghetti, noodles and similar food-stuffs; and the invention relates, more particularly, to a novel and simple construction of automatic press which is strong and durable, and which provides a novel means for operating the press plunger.

The invention has for its principal object to provide a press plunger which is actuated by a screw-threaded shaft or stem, and a novel means for turning or feeding said screw-threaded shaft or stem whereby the requisite rotary movement is transmitted to said screw-threaded shaft or stem to produce its longitudinal vertical travel, said means being of such character that all necessity for splining or grooving said screw-threaded shaft or stem, as has heretofore been the practice in most presses of this character, is eliminated. By thus eliminating the spline or groove in said screw-threaded shaft or stem the thread thereof is continuous and free from interruptions in its continuity, and consequently a smoother action, increased bearing, and elimination of the danger of chipping, grinding, or otherwise injuring the threads of the shaft or stem adjacent to such a groove or spline is entirely avoided.

Other objects of the present invention, not at this time more particularly enumerated, will be clearly understood from the following detailed description of the present invention.

The invention consists primarily, therefore, in the novel feeding and operating means for the press-plunger, and, furthermore, the invention consists in the novel arrangements and combinations of the several devices and parts, as well as in the details of the construction of the same, all of which will be more fully described in detail in the following specification, and then finally embodied in the claims which are appended to and which form an essential part of said specification.

The invention is clearly illustrated in the accompanying drawings, in which:—

Figure 1 is a front elevation of a press for making macaroni and similar substances, the same being equipped with the novel press-plunger operating means which is made according to and which embodies the principles of the present invention. Fig. 2 is a rear elevation of the same. Fig. 3 is a detail vertical, longitudinal section of said press-plunger operating means, taken on line 3—3 in said Fig. 2, looking in the direction of the arrow $x$. Fig. 4 is a detail horizontal section of the same, taken on line 4—4 in said Fig. 3, looking downward.

Similar characters of reference are employed in all of the above described views to indicate corresponding parts.

Referring now to the said drawings, the reference character 1 indicates the base of the machine, from which extend upwardly a pair of columns 2, upon which is supported the press cylinder 3. Arranged within said cylinder 3 is the press-plunger 4 which is adapted to be reciprocated therein, and which is designed to enter said cylinder at the top and press the dough through the forming dies contained in said cylinder in the manner well known and usual in machines or presses of this type.

Supported at the top of the columns 2, and extending transversely across the same is a head-frame casting 5. Projecting rearwardly from points adjacent to the ends of said head-frame 5 are a pair of bearing brackets 6 in which is journaled a transversely extending driving-shaft 7. Secured to one end of said driving-shaft 7 is a driving-pulley 8 disposed between a pair of loose-pulleys 9 and 9'. The said loose-pulley 9 is adapted to support a driving-belt, and the loose-pulley 9' is adapted to support a crossed driving-belt, either of which may be shifted upon said driving-pulley 8 so as to drive said shaft in either direction as desired. Extending rearwardly from said head-frame 5, at a point centrally located between its ends, is a bearing-member 10 in which is journaled a short vertical shaft or spindle 11. Secured upon the lower end of said shaft or spindle 11 is a bevel-gear 12, and secured upon the upper end of said shaft or spindle 11 is a spur-gear or pinion 13. Said head-frame 5 is further provided with an internally screw-threaded opening 14 which provides a stationary nut-piece or portion in which is mounted an externally screw-threaded stem or shaft 15, the same being so positioned as to register in alinement with the vertical axis of the press-cylinder 3. The said press-plunger 4 is suitably affixed to the lower end of said screw-threaded stem or shaft 15. Extending upwardly from said head-frame 5, and preferably forming an integral part thereof, is a foot-step bearing member 16, which is provided with a receiving-portion or seat 17. Said screw-threaded stem or shaft 15 extends upwardly through said thrust-bearing member 16. Journaled or seated in said receiving-portion or seat 17, so as to rotate therein is the journal-portion 18 of a vertically and upwardly extending tubular-member or sleeve 19, into the internal longitudinal opening 20 of which the upper end of said screw-threaded stem or shaft 15 extends or projects. Secured to the lower end of said tubular-member or sleeve 19, by means of a key 21, or any other suitable fastening means, is a gear-wheel 22, the same being adapted to operatively mesh with said spur-gear or pinion 13 on the upper end of said shaft or spindle 11. Said tubular-member or sleeve 19 is provided in its walls with oppositely facing elongated longitudinal slots or key-ways 23, the same corresponding in length, or slightly exceeding in length, the length of the desired stroke or necessary vertical travel of said screw-threaded shaft or stem 15, and connected with the upper end of the latter is a transverse cross-pin or key 24, the respective ends of which extend oppositely through and ride in the respective slots or key-ways 23 of said tubular-member or sleeve 19. It will be apparent when said tubular-member or sleeve 19 is rotated it will transmit such rotation through said cross-pin or key 24, the ends of which project through its oppositely positioned slots or key-ways, to the screw-threaded shaft or stem 15, whereby the latter is caused to turn in its nut-piece or portion formed in the head-frame 5, and thus be caused to travel up or down imparting a like vertical movement to said press-plunger 4, according to the direction of the rotation thus imparted, and while such rotation is transmitted through said cross-pin or key 24 it will also be apparent that the latter will freely travel vertically in said slots or key-ways 23, as will follow from the vertical movement of the screw-threaded shaft or stem 15, without in any way interfering with or preventing the transmission therethrough of the requisite rotary movement.

The means for driving the bevel-gear 12, to transmit to the tubular-member or sleeve 19 the desired rotary motion, comprises the following transmission mechanism:—Mounted loosely upon said driving-shaft 7, so as to turn independently thereof, is a sleeve 25 upon which is secured a bevel-gear 12. Also secured upon said sleeve 25 is a gear-wheel 27. Secured directly upon said driving-shaft 7, but adjacent in position to said gear-wheel 27 is a spur-gear 28. Extending outwardly from one end of said head-frame 5 is a stud-shaft 29. Rotatably mounted on said stud-shaft 29 is a sleeve 30 upon which are secured a spur-gear 31 and a gear-wheel 32. Said sleeve 30 is slidable longitudinally upon said stud-shaft 29 so that said spur-gear 31 and said gear-wheel 32 may be moved into mesh respectively with said gear-wheel 27 and said spur-gear 28. When thus meshed together the said spur-gear 28, which rotates with said driving-shaft 7, drives said gear-wheel 32, sleeve 30 and spur-gear 31, the latter meshing with said gear-wheel 27 drives the same and said bevel spur-gear 26 to in turn rotate said bevel-gear 12, and thus rotating said screw-threaded stem or shaft 15 by the means and in the manner already above described. This means of transmission produces a slow but powerful movement of said screw-threaded shaft or stem 15 because of the gearing down or indirect drive through the above described speed-reducing train of gears. If, however, greater speed of vertical movement of said screw-threaded shaft or stem 15 is desired, the said bevel-gear 12 may be driven more directly from the driving-shaft 7, as follows:—The sleeve 30 is moved outwardly upon said stud-shaft 29 to disengage said spur-gear 31 and gear-wheel 32 respectively from meshing with said gear-wheel 27 and spur-gear 28. A female clutch member 33 is connected with said sleeve 25, into engagement with which may be moved a male clutch member 34, which is slidably arranged upon but keyed by the key 35 to said driving-shaft 7, so that said sleeve 25 and bevel spur-gear 26 may be driven directly by said shaft 7 to rotate said bevel-gear 12, and thus more directly and more speedily rotate said screw-threaded shaft or stem 15 through the interconnecting transmission means between the same and said bevel-gear 12.

From the above description it will be clearly evident that the present invention provides a strong, durable and smoothly operating transmission or rotating means for said screw-threaded shaft or stem 15, which wholly obviates any necessity of cutting, grooving or otherwise injuring or marring the threads thereof, or in any way interrupting the continuity of said thread, so that said threads work smoothly and easily, and with complete contact and bearing within the nut-portion of the head-frame 5, without danger of chipping, grinding or other similar evils which would constantly prove a source of wear and annoyance, and which would tend to increase the friction and consequently utilize more power in operating the machine.

I am aware that some changes may be made in the general arrangements and combinations of the devices and parts, as well as in the details of the construction of the same, as described in the accompanying specification, without departing from the scope of my present invention as defined in the claims which are appended hereto. Hence, I do not limit my invention to the exact arrangements and combinations of the devices and parts as set forth in the foregoing specification, nor do I confine myself to the exact details of the construction of said parts as illustrated in the accompanying drawings.

I claim:—

1. In a machine of the kind described the combination with a press cylinder and its plunger of means for reciprocating said plunger comprising, a stationary nut-portion, a screw-threaded stem engaging said nut-portion to the lower end of which is connected said plunger, a bearing member above said nut-portion, a tubular-sleeve rotatably journaled by its lower end in said bearing member, the upper end of said screw-threaded stem being adapted to enter and move vertically within said tubular sleeve, said tubular-sleeve being provided in its sides with longitudinally extending and oppositely disposed slots, a cross-pin connected with the upper end of said screw-threaded stem with its opposite ends respectively extending into and riding in said oppositely disposed slots, and means for rotating said tubular sleeve, as and for the purposes specified.

2. In a machine of the kind described the combination with a press cylinder and its plunger of means for reciprocating said plunger comprising, a stationary nut-portion, a screw-threaded stem engaging said nut-portion to the lower end of which is connected said plunger, a bearing member above said nut-portion, a tubular-sleeve rotatably journaled by its lower end in said bearing member, the upper end of said screw-threaded stem being adapted to enter and move vertically within said tubular-sleeve, said tubular-sleeve being provided in its sides with longitudinally extending and oppositely disposed slots, a cross-pin connected with the upper end of said screw-threaded stem with its opposite ends respectively extending into and riding in said oppositely disposed slots, and a variable speed transmission means for rotating said tubular-sleeve, as and for the purposes specified.

3. In a machine of the kind described the combination with a press cylinder and its plunger of means for reciprocating said plunger comprising, a stationary nut-portion, a screw-threaded stem engaging said nut-portion to the lower end of which is connected said plunger, a bearing member above said nut-portion, a tubular-sleeve rotatably journaled by its lower end in said bearing member, the upper end of said screw-threaded stem being adapted to enter and move vertically within said tubular-sleeve, said tubular-sleeve being provided in its sides with longitudinally extending and oppositely disposed slots, a cross-pin connected with the upper end of said screw-threaded stem with its opposite ends respectively extending into and riding in said oppositely disposed slots, a gear-wheel affixed to said tubular-member, a spur-gear meshing with and driving said gear-wheel, and transmission mechanism for driving said spur-gear in either direction.

4. In a machine of the kind described the combination of a press cylinder and its press plunger of means for producing the vertical movements of the latter comprising, a head-frame arranged above said cylinder and provided with an internally screw-threaded opening forming a nut-portion, a bearing member connected with said head-frame in longitudinal alinement with said nut-portion, said bearing member having a receiving-seat, a vertically extending elongated tubular-sleeve, said tubular-sleeve having a journal-portion at its lower end rotatably seated in said receiving-seat of said bearing member, an externally screw-threaded stem connected with said press-plunger and passing upwardly through and engaging said nut-portion with its upper end extending into said tubular-sleeve, said tubular-sleeve being provided in its sides with longitudinally extending and oppositely disposed slots, a cross-pin connected with the upper end of said screw-threaded stem having its opposite ends respectively extending into and riding in said oppositely disposed slots, and means for rotating said tubular-sleeve.

5. In a machine of the kind described the combination of a press cylinder and its press plunger of means for producing the vertical movements of the latter comprising, a head-frame arranged above said cylinder and provided with an internally screw-threaded opening forming a nut-portion, a bearing member connected with said head-frame in longitudinal alinement with said nut-portion, said bearing member having a receiving-seat, a vertically extending elongated tubular-sleeve, said tubular-sleeve having a journal-portion at its lower end rotatably seated in said receiving-seat of said bearing member, an externally screw-threaded stem connected with said press-plunger and passing upwardly through and engaging said nut-portion with its upper end extending into said tubular-sleeve, said tubular-sleeve being provided in its sides with longitudinally extending and oppositely disposed slots, a cross-pin connected with the upper end of said screw-threaded stem having its opposite ends respectively extending into and riding in said oppositely disposed slots, a gear-wheel affixed to said tubular-member, a spur-gear meshing with and driving said gear-wheel, and transmission mechanism for driving said spur-gear in either direction.

In testimony that I claim the invention set forth above I have hereunto set my hand this 27th day of January, 1915.

CONRAD AMBRETTE.

Witnesses:
GEORGE D. RICHARDS,
MAYBELLE MCADOO.

Copies of this patent may be obtained for five cents each, by addressing the "Commissioner of Patents, Washington, D. C."